(12) United States Patent
Kawashima et al.

(10) Patent No.: US 6,631,235 B1
(45) Date of Patent: Oct. 7, 2003

(54) PLANAR LIGHTWAVE CIRCUIT PLATFORM AND METHOD FOR MANUFACTURING THE SAME

(75) Inventors: Hiroshi Kawashima, Chiyoda-ku (JP); Kazutaka Nara, Chiyoda-ku (JP); Shiro Nakamura, Chiyoda-ku (JP); Kazunori Watanabe, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/595,058

(22) Filed: Jun. 16, 2000

(30) Foreign Application Priority Data

Jun. 17, 1999 (JP) .............................. 11-171529

(51) Int. Cl.$^7$ ................................. G02B 6/10
(52) U.S. Cl. ...................... 385/129; 385/130; 385/131
(58) Field of Search ................. 385/129, 130, 385/131, 132; 65/385, 386, 417, 418, 421

(56) References Cited

U.S. PATENT DOCUMENTS

| 4,425,146 A | * | 1/1984 | Izawa | 65/420 |
| 4,735,677 A | * | 4/1988 | Kawachi et al. | 156/633 |
| 5,193,137 A | * | 3/1993 | Hoshino et al. | 385/129 |
| 5,243,677 A | * | 9/1993 | Kanamori et al. | 385/130 |
| 5,519,803 A | * | 5/1996 | Shiono | 385/132 |

FOREIGN PATENT DOCUMENTS

JP          63131104 A          6/1988

\* cited by examiner

*Primary Examiner*—Brian Healy
*Assistant Examiner*—Kevin S Wood
(74) *Attorney, Agent, or Firm*—Knobbe, Martens, Olson & Bear LLP

(57) ABSTRACT

The present invention provides a planar lightwave circuit platform and its method for manufacturing by which the characteristics of the planar lightwave circuit become stable. In a planar lightwave circuit platform comprising quartz-based lower cladding layer (2), height adjusting layer (3), core layer (4), and upper cladding layer (5) formed in order on substrate (1), wherein the glass softening temperature of the height adjusting layer (3) is set to be higher than the glass softening temperatures and the temperatures for transparent-vitrification of the core layer (4) and upper cladding layer (5).

8 Claims, 3 Drawing Sheets

PLANAR LIGHTWAVE CIRCUIT PLATFORM AND METHOD FOR MANUFACTURING THE SAME

FIELD OF THE INVENTION

The present invention relates to a hybrid integrated-type planer lightwave circuit platform to be used for optical transmissions, and its method for manufacturing.

BACKGROUND OF THE INVENTION

As a method to improve mass-productivity of an optical module to be used in the field of optical transmissions, and reduce the cost thereof, the mounting method by which passive parts such as an optical coupler and active parts such as a light receiving/emitting element are hybrid-integrated has been widely noticed. Particularly, the method for mounting active parts on a platform having planar lightwave circuits (PLC) has been noticed in terms of its excellent mass-productivity and the integration of various optical circuits and a light receiving/emitting element enabled by the method.

A prior-art hybrid integrated-type planar lightwave circuit platform has the structure shown in FIG. 4, for example, and the PLC platform has a silica-based waveguide formed on a Si substrate, and is manufactured by the following processes. That is, in FIG. 4:

1) Uneven steps having a predetermined planar patterns are formed on the Si substrate 1 to form a terrace portion 1a. This terrace portion 1a is loaded with optical elements later.
2) On the Si substrate 1, silica-based soot is deposited by means of flame hydrolysis deposition method (FHD), and transparent-vitrified at a high temperature, whereby a lower cladding layer 2 made from silica-based glass is formed. As gases for the material of the silica-based soot, $SiCl_4$ to become silica glass $SiO_2$ and $PCl_3$ and $BCl_3$ to become dopants $P_2O_5$ and $B_2O_3$ for adjusting the glass softening temperature are used. $P_2O_5$ and $B_2O_3$ are dopants having the effect of lowering the glass softening temperature of silica glass. The sintering temperature for vitrification to change the soot condition into the transparent glass condition is set to be higher than the glass softening temperature of the lower cladding layer 2.
3) Then, the surface of the covered Si substrate 1 is mechanically ground to expose the terrace portion 1a and make the surface flat.
4) Next, height adjusting layer 3 made from silica-based glass with the same refractive index as that of the lower cladding layer 2 is formed. Dopants $P_2O_5$ and $B_2O_3$ which have the effect of lowering the glass softening temperature are added to the height adjusting layer 3. The amount of dopants to add is four times the amount of dopants added to the lower cladding layer 2. Furthermore, the temperature for transparent-vitrification of the height adjusting layer 3 is set to be higher than the glass softening temperature of the height adjusting layer 3. This height adjusting layer 3 is provided in order to adjust activation layer 6a of optical element 6 to be loaded later and core layer 4 of the waveguide to be equal in height.
5) Then, the core layer 4 made from silica-based glass is formed. To the core layer 4, dopants $P_2O_5$ and $B_2O_3$, which have the function of lowering the glass softening temperature of quartz glass, are added by an amount being approximately 1.1 times of the amount added to the lower cladding layer 2, and furthermore, $GeO_2$ is added so that the refractive index of the core layer becomes approximately 0.5% greater than those of the lower cladding layer 2 and height adjusting layer 3. The temperature for transparent-vitrification of the core layer 4 is set to be higher than the glass softening temperature for the core layer 4.
6) Next, the core layer 4 is etched by means of reactive ion etching (RIE) so as to have core patterns having a predetermined function.
7) Next, upper cladding layer 5 made from silica-based glass is deposited, and the core layer 4 is buried therein. To the upper cladding layer 5, dopants $P_2O_5$ and $B_2O_3$ which have the effect of lowering the glass softening temperature are added by an amount being approximately three times the amount of dopants added to the lower cladding layer 2. In addition, the temperature for transparent-vitrification of the upper cladding layer 5 is higher than the glass softening temperature thereof, and the upper cladding layer is transparent-vitrified at a temperature lower than the glass softening temperature of the core layer 4.
8) The height adjusting layer 3, core layer 4, and upper cladding layer 5 on the terrace portion 1a are removed.
9) A predetermined pattern of electrode 7 is formed on the terrace portion 1a.

The height adjusting layer 3 is used to make the activation layer 6a of the optical element 6 loaded on the terrace portion 1a and core layer 4 to be equal in height, and is a thin-film with a thickness of 10 μm or less.

In the case where a glass film is formed by means of FHD, the silica-based glass film has properties whereby if the silica-based glass film is thin, transparent-vitrification by means of sintering becomes difficult, and also, if the amount of added dopants $P_2O_5$ and $B_2O_3$ increases, transparent-vitrification becomes easier.

Therefore, since the height adjusting layer 3 is thin (thickness: 10 μm or less), in order to make transparent-vitrification thereof easier, dopants are added to the height adjusting layer 3 by a larger amount than that of dopants added to the core layer 4 and upper cladding layer 5.

The quartz glass has a property whereby if the dopant amount is increased, the glass softening temperature lowers. Therefore, when the glass softening temperatures of the lower cladding layer 2, height adjusting layer 3, core layer 4, and upper cladding layer 5 are $T_U$, $T_T$, $T_C$, and $T_O$, the relationship among them is as shown in expression (1). The glass softening temperature of the height adjusting layer 3 is lower than that of the core layer 4 and upper cladding layer 5.

$$T_U > T_C > T_O > T_T \tag{1}$$

Since the temperatures for transparent-vitrification of the core layer 4 and upper cladding layer 5 are higher than the glass softening temperatures $T_C$ and $T_O$ of the core layer 4 and upper cladding layer 5, when sintering and transparent-vitrifying the core layer 4 and upper cladding layer 5, the height adjusting layer 3 whose glass softening temperature is lower than that of the core layer 4 and upper cladding layer 5 is softened, and the core pattern of the core layer 4 formed on the height adjusting layer is deformed, and therefore, it becomes difficult to stably obtain desired optical performance.

OBJECT AND SUMMARY OF THE INVENTION

The present invention is made in order to solve the abovementioned problems, and the object of the invention is to provide a planar lightwave circuit platform constructed by forming a silica-based lower cladding layer, height adjusting layer, core layer, and upper cladding layer in order on a substrate, wherein the glass softening temperature of the height adjusting layer is higher than that of the core layer and upper cladding layer.

Herein, the height adjusting layer is provided in order to adjust the activation layer of a loaded optical element and core layer to be equal in height.

In another aspect of the planar lightwave circuit platform of the invention, the temperature for transparent-vitrification of each layer is higher than the glass softening temperature of the same layer, and the glass softening temperature of the height adjusting layer is higher than the temperatures for transparent-vitrification of the core layer and upper cladding layer.

The planar lightwave circuit platform of the invention is used for an optical module as one of purposes for use.

Another object of the invention is to provide a method for manufacturing a planar lightwave circuit platform which has a process to form a silica-based lower cladding layer, height adjusting layer, core layer, and upper cladding layer in order on a substrate, wherein silica-based soot having a sufficient thickness for transparent-vitrification by means of sintering is deposited by means of FHD, and transparent-vitrified, and then formed in a predetermined thickness, whereby the height adjusting layer is thinly formed.

Herein, the height adjusting layer is provided in order to adjust the activation layer a loaded optical element and core layer of to be equal in height. Furthermore, the silica-based soot having a sufficient thickness means a silica-based soot which has a thickness to be transparent-vitrified by means of sintering in the condition where the soot is added with dopants by a predetermined amount.

In the method for manufacturing a planar lightwave circuit platform of the invention, the lower cladding layer, height adjusting layer, core layer, and upper cladding layer is formed through transparent-vitrification treatment, and preferably, the temperature for transparent-vitrification of each layer is set to be higher than the glass softening temperature of the same layer, dopants are added to each layer to lower the glass softening temperature, and the amount of dopants to be added to the core layer and upper cladding layer is increased more than that of dopants to be added to the height adjusting layer to make the glass softening temperature of the height adjusting layer higher than the temperatures for transparent-vitrification of the core layer and upper cladding layer.

After transparent-vitrification of the height adjusting layer, etching or grinding is preferably employed for formation in a predetermined thin thickness.

According to the invention, the glass softening temperature of the height adjusting layer is adjusted to be higher than that of the core layer and upper cladding layer. Therefore, when transparent-vitrifying the core layer and upper cladding layer at a high temperature, the temperature can be set so that the height adjusting layer is not softened. Accordingly, since the height adjusting layer is not softened, the core layer with a pattern is prevented from being deformed, and a waveguide circuit which is sensitively influenced by the pattern form of the core layer (for example, Mach-Zehnder interferometer) can be stably formed on the substrate. Furthermore, by applying the planar lightwave circuit platform of the invention to an optical module, an optical module which is excellent in optical performance and high in reliability can be provided.

Furthermore, according to the invention, in order to form the height adjusting layer, since silica-based soot is formed in a sufficient thickness so as to be transparent-vitrified by means of sintering, and then a glass film is formed in a predetermined thin thickness, satisfactory transparent-vitrification is achieved even when the softening temperature is high, that is, a composition in which the amount of dopants is less is employed. In addition, when transparent-vitrifying the core layer and upper cladding layer at a high temperature, the temperature can be set so that the height adjusting layer is not softened, and since the height adjusting layer is not softened, a waveguide circuit can be stably formed on the substrate.

Moreover, by reducing the thickness of the height adjusting layer by means of etching and grinding, it can be precisely formed in a required and predetermined thickness.

As mentioned above, the invention has an excellent effect whereby optical performance of the planar lightwave circuit on the planar lightwave circuit platform is stabilized.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENT

Hereinafter, the present invention shall be described in detail with reference to the drawings.

Figure 1A:
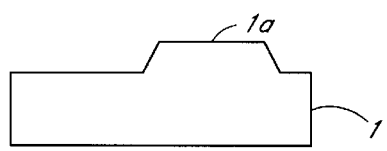
FIG. 1A through FIG. 1J are process explanatory views of the first embodiment of the method for manufacturing the planar lightwave circuit platform relating to the invention.

FIG. 1A through FIG. 1J are explanatory views of the processes of an embodiment of the method for manufacturing the planar lightwave circuit platform relating to the invention. The processes are as follows:

1) First, (100) the surface with the crystal face of (100) crystal orientation of the Si substrate 1 is etched by means of anisotropic etching using KOH solution as an etchant to form steps of a predetermined flat pattern, whereby a terrace portion 1a is provided (FIG. 1A).

2) Next, silica-based soot is deposited on the substrate by means of FHD, and transparent-vitrified at a predetermined temperature to form a silica-based glass film with a thickness of approximately 50 $\mu$m, and this film is used as the lower cladding layer 2. As gases for the material of the silica-based soot, $SiCl_4$ to become silica glass $SiO_2$ and $PCl_3$ and $BCl_3$ to become dopants $P_2O_5$ and $B_2O_3$ for adjusting the glass softening temperature are used. $P_2O_5$ and $B_2O_3$ are dopants having the effect of lowering the glass softening temperature of silica glass. The sintering temperature for vitrification to change the soot condition into the transparent glass condition is set to be higher than the glass softening temperature of the lower cladding layer 2.

Figure 1B:
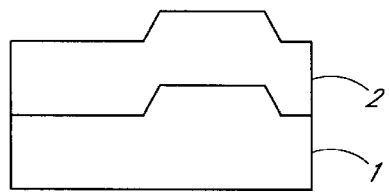

At this stage, in accordance with the steps formed at the Si substrate 1, the lower cladding layer 2 has also steps (FIG. 1B).

Figure 1C:
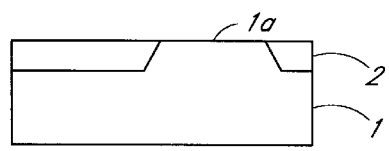

3) Next, the surface is machined to be flat, the terrace portion 1a is exposed, whereby the terrace portion 1a and lower cladding layer 2 become the same plane (FIG. 1C).

Figure 1D:
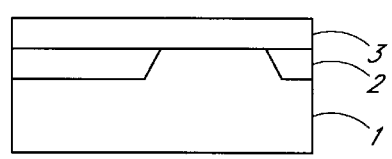

4) Next, on the flattened Si substrate 1, a silica-based glass film with a thickness of approximately 15 $\mu$m, to which dopants (to lower the glass softening temperature) are added by almost the same amount as that of the lower cladding layer 2, is formed by means of FHD to form height adjusting layer 3. The temperature for transparent-vitrification when sintering the height adjusting layer 3 is set to be higher than the softening temperature of the height adjusting layer 3. The height adjusting layer 3 thus formed is made sufficiently transparent, and the accuracy in thickness can be made to be ±0.4 $\mu$m (FIG. 1D).

Figure 1E:
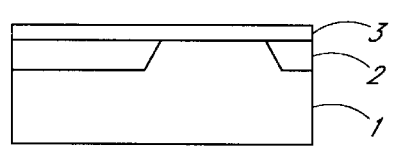

5) Next, the height adjusting layer 3 on the Si substrate 1 is etched by approximately 10 $\mu$m by means of RIE so as to have a required and predetermined thickness (for example, approximately 5 $\mu$m) (FIG. 1E). At this time, the accuracy in etching depth can be made to be ±0.1 $\mu$m. Furthermore, the surface is etched by approximately 0.1 $\mu$m by using a water solution of hydrofluoric acid, whereby a layer damaged due to RIE is removed. The height adjusting layer 3 formed by this method has a thickness of 5 $\mu$m±0.5 $\mu$m with excellent accuracy. The height adjusting layer 3 can be etched by means of wet-etching using a water solution of hydrofluoric acid.

Figure 1F:
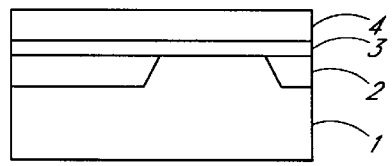

6) Next, a silica glass film to become a core layer 4 with a thickness of 7 $\mu$m is formed by means of FHD. To the core layer 4, dopants having the effect of lowering the softening temperature are added by an amount approximately 1.1 times that of dopants added to the lower cladding layer 2 and height adjusting layer 3, and furthermore, $GeO_2$ is added so that the refractive index of the core layer becomes approximately 0.5% greater than that of the lower cladding layer 2 and height adjusting layer 3 (FIG. 1F). In addition, the temperature for transparent-vitrification when sintering the core layer 4 is set to be lower than the softening temperatures of the lower cladding layer 2 and height adjusting layer 3, and higher than the softening temperature of the core layer 4.

Figure 1G:
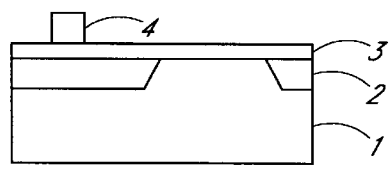

7) Next, the core layer 4 is patterned by means of RIE, and a channel waveguide patterns are formed at a predetermined position (FIG. 1G).

Figure 1H:
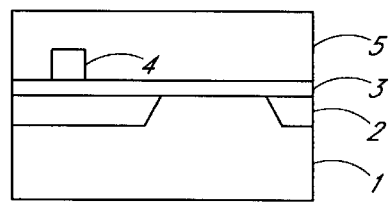

8) Next, by means of FHD, upper cladding layer 5 is formed of a silica-based glass film whose refractive index is matched with that of the lower cladding layer 2, and covered on the core layer 4 with a channel waveguide pattern (FIG. 1H). In order to prevent the height adjusting layer from being softened when the upper cladding layer 5 is transparent-vitrified, dopants having the effect of lowering the softening temperature are added to the upper cladding layer 5 by an amount three times that of dopants added to the lower cladding layer 2 and height adjusting layer 3 so that the softening temperature of the upper cladding layer 5 becomes lower than that of the height adjusting layer 3, whereby the upper cladding layer 5 is transparent-vitrified at a temperature higher than the softening temperature of the upper cladding layer 5.

Figure 1I:
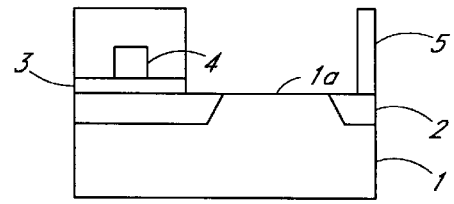

9) Next, the height adjusting layer 3 and upper cladding layer 5 on the terrace portion 1a is removed by means of RIE (FIG. 1I).

Figure 1J:
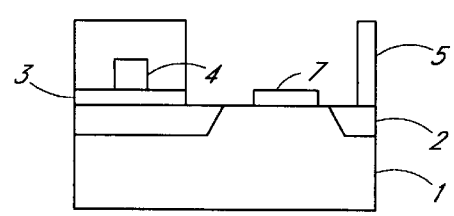

10) Next, an electrode 7 which is patterned is formed by means of the liftoff method on the terrace portion 1a (FIG. 1J).

By the abovementioned processes, since the amount of dopants added to the height adjusting layer 3 is less than that of the core layer 4 and upper cladding layer 5, the glass softening temperature of the height adjusting layer 3 inevitably becomes higher than that of the core layer 4 and upper cladding layer 5 (in this embodiment, the glass softening temperature of the height adjusting layer 3 is set to be higher than the temperatures for transparent-vitrification of the core layer 4 and upper cladding layer 5).

Therefore, by such a manufacturing process, a planar lightwave circuit platform can be formed which has the height adjusting layer 3 which is formed to have a predetermined height so that its glass softening temperature is higher than the glass softening temperatures and the temperatures for transparent-vitrification of the core layer 4 and upper cladding layer 5.

The second embodiment of the invention shall be described as follows.

1) The abovementioned processes shown in FIG. 1A through FIG. 1D are carried out following the same method described above to form a transparent-vitrified height adjusting layer 3.

2) Next, the height adjusting layer 3 on the Si substrate 1 is ground by approximately 7 $\mu$m so as to have a thickness of approximately 8 $\mu$m. Then, the height adjusting layer 3 is polished by approximately 3 $\mu$m by means of chemical mechanical polishing (CMP) so as to have a required and predetermined thickness (for example, 5 $\mu$m). Furthermore, the surface is etched by approximately 0.1 $\mu$m by using a water solution of hydrofluoric acid to remove a layer damaged due to CMP. The height adjusting layer 3 thus formed has a thickness of 5 $\mu$m±0.5 $\mu$m with excellent accuracy (FIG. 1E).

3) Thereafter, the abovementioned processes shown in FIG. 1F through FIG. 1J are carried out following the same method as described above, whereby a planar lightwave circuit platform having the height adjusting layer 3, which is formed so as to have a required and predetermined height, and higher in the softening temperature than the core layer 4 and upper cladding layer 5, can be formed.

Figure 2:
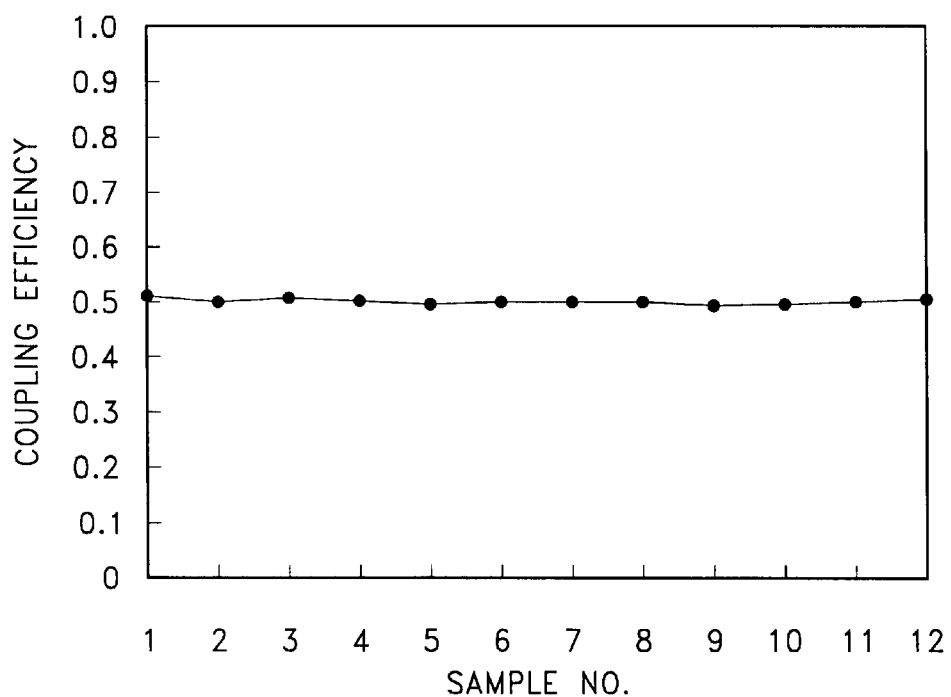
FIG. 2 is a diagram showing the characteristics of the coupling ratios of directional couplers on the planar lightwave circuit platform of the first embodiment manufactured by the method mentioned above.

By the processes described in the first and second embodiments, twelve planar lightwave circuit platforms (not illustrated) having directional couplers formed of patterned core layers 4 were formed on one Si substrate 1, and the coupling ratios of these twelve directional couplers were measured. The results of measurement of the first embodiment are shown in FIG. 2. As is clearly understood from FIG. 2, the coupling ratios are within the range between 0.49 and 0.51, and it is understood that the formed directional couplers have stable characteristics. The results of measurement of the coupling efficiencies of the second embodiment are, as in FIG. 2, also within the range between 0.49 and 0.51, and it was confirmed that the formed directional coupler have stable characteristics. This is realized since, when the core layer 4 provided with channel waveguide patterns were covered with the upper cladding layer 5 and transparent-vitrified, softening of the height adjusting layer 3 hardly occurred, and therefore, the core layer 4 was not deformed.

Figure 3:
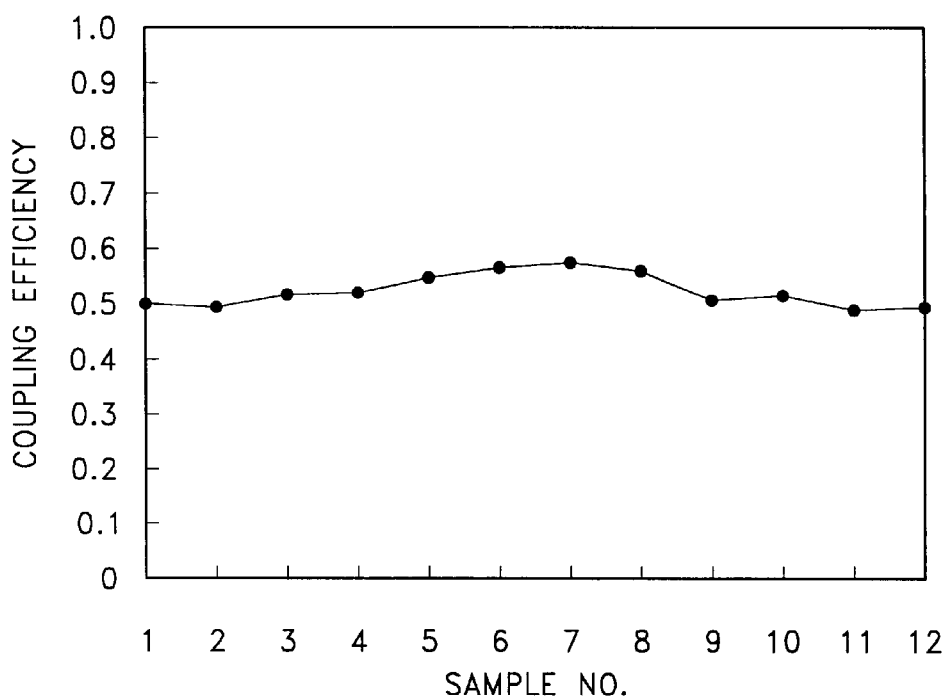
FIG. 3 is a diagram showing the characteristics of the coupling ratios of directional couplers on the planar lightwave circuit platform manufactured by the prior-art method.
Figure 4:
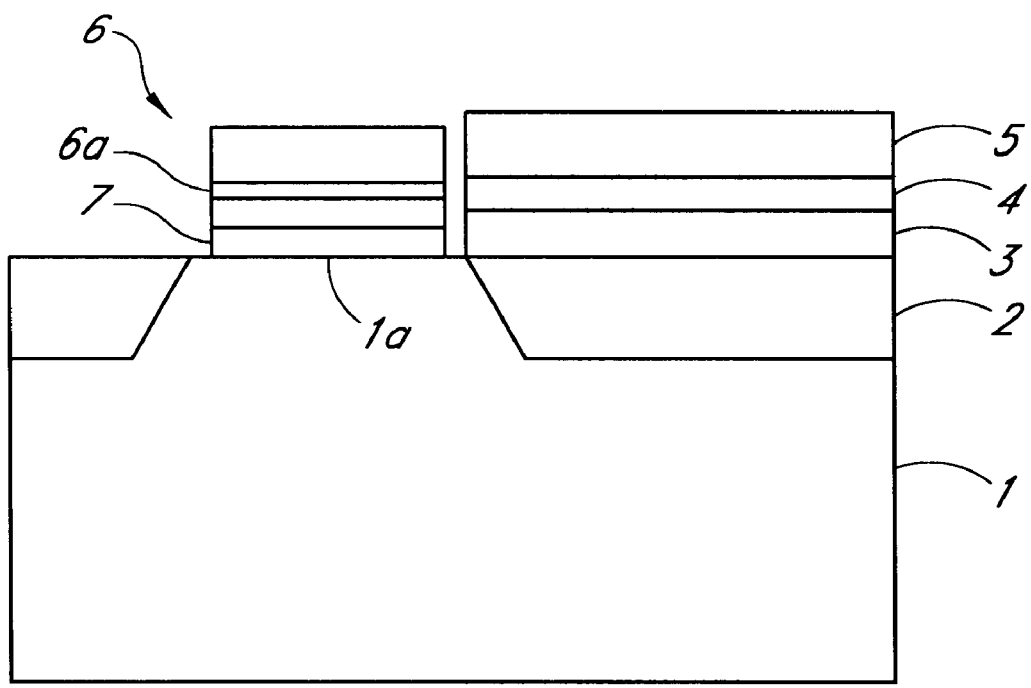
FIG. 4 is an explanatory view of the section of the prior-art planar lightwave circuit platform.

On the other hand, twelve planar lightwave circuit platforms having the same structure as that of the planar waveguide circuit platforms mentioned above were formed on one Si substrate 1 by using the prior-art (dopants are added to the height adjusting layer 3 by an amount larger than that of the core layer 4 and upper cladding layer 5, and the glass softening temperature of the height adjusting layer 3 is lower than the glass softening temperatures and the temperatures for transparent-vitrification of the core layer 4 and upper cladding layer 5), and the coupling ratios of these twelve directional couplers were measured. The results of measurement are shown in FIG. 3. As is clearly understood from FIG. 3, the coupling ratios are within the range between 0.49 and 0.58, which are greatly varied in comparison with the abovementioned planar lightwave circuit platforms manufactured following the first and second embodiments.

What is claimed is:

1. A planar lightwave circuit platform comprising a silica-based lower cladding layer, height adjusting layer, core layer, and upper cladding layer formed in order on a substrate, wherein the temperature for transparent-vitrification of each layer is higher than the glass softening temperature of the same layer, and the glass softening temperature of the height adjusting layer is higher than the temperatures for transparent-vitrification of the core layer and upper cladding layer.

2. The planar lightwave circuit platform of claim 1, wherein the planar lightwave circuit platform is used for an optical module.

3. A method for manufacturing a planar lightwave circuit platform having processes to form a silica-based lower cladding layer, height adjusting layer, core layer, and upper cladding layer in order on a substrate, wherein the height adjusting layer is formed by depositing silica-based soot with a sufficient thickness to be transparent-vitrified by means of sintering by means of flame hydrolysis deposition, by transparent vitrifying the silica-based soot, wherein the lower cladding layer, height adjusting layer, core layer, and upper cladding layer are formed through transparent-vitrification, and the temperature for transparent-vitrification of each layer is set to be higher than the glass softening temperature of the same layer, and dopants to lower the glass softening temperature are added to each other, and the amount of dopants to be added to the core layer and upper cladding layer is increased to be more than the amount of dopants to be added to the height adjusting layer, whereby the glass softening temperature of the height adjusting layer is made higher than the temperatures for transparent-vitrification of the core layer and upper cladding layer.

4. A planar lightwave circuit platform comprising a silica-based lower cladding layer, height adjusting layer, core layer and upper cladding layer formed in order on a substrate, wherein the glass softening temperature of the height adjusting layer is higher than that of the core layer and upper cladding layer, wherein the temperature for transparent-vitrification of each of the lower cladding layer, height adjusting layer, core layer, and upper cladding layer is higher than the glass softening temperature of the same layer, and the glass softening temperature of the height adjusting layer is higher than the temperature for transparent-vitrification of the core layer and upper cladding layer.

5. The planar lightwave circuit platform of claim 4, wherein the planar lightwave circuit platform is used for an optical module.

6. A planar lightwave circuit platform comprising a silica-based lower cladding layer, height adjusting layer, core layer, and upper cladding layer formed in order on a substrate, wherein a glass softening temperature of the height adjusting layer is higher than that of the core layer and upper cladding layer, wherein the temperature for transparent-vitrification of each of the lower cladding layer, height adjusting layer, core layer, and upper cladding layer is higher than the glass softening temperature of the same layer, and the glass softening temperature of the height adjusting layer is higher than the temperature for transparent-vitrification of the core layer and upper cladding layer.

7. A planar lightwave circuit platform comprising a silica-based lower cladding layer, height adjusting layer, core layer, and upper cladding layer formed in order on a substrate, wherein a glass softening temperature of the height adjusting layer is higher than that of the core layer and upper cladding layer, wherein dopants having the effect of lowering the softening temperature of a doped material are added to said core layer by an amount about 1.1 times that of dopants added to the lower cladding layer and the height adjusting layer.

8. A planar lightwave circuit platform comprising a silica-based lower cladding layer, height adjusting layer, core layer, and upper cladding layer formed in order on a substrate, wherein a glass softening temperature of the height adjusting layer is higher than that of the core layer and upper cladding layer, wherein dopants having the effect of lowering the softening temperature of a doped material are added to said upper cladding layer by an amount about 3 times that of dopants added to the lower cladding layer and the height adjusting layer.

* * * * *